(12) United States Patent
Seigel et al.

(10) Patent No.: US 10,230,734 B2
(45) Date of Patent: Mar. 12, 2019

(54) USAGE-BASED MODIFICATION OF USER PRIVILEGES

(71) Applicant: QUEST SOFTWARE INC., Aliso Viejo, CA (US)

(72) Inventors: Jake Seigel, Halifax (CA); Robert MacIntosh, Halifax (CA)

(73) Assignee: QUEST SOFTWARE INC., Aliso Viejo, CA (US)

(*) Notice: Subject to any disclaimer, the term of this patent is extended or adjusted under 35 U.S.C. 154(b) by 154 days.

(21) Appl. No.: 14/962,211

(22) Filed: Dec. 8, 2015

(65) Prior Publication Data

US 2017/0163650 A1 Jun. 8, 2017

(51) Int. Cl.
*H04L 29/06* (2006.01)

(52) U.S. Cl.
CPC .......... *H04L 63/102* (2013.01); *H04L 63/104* (2013.01)

(58) Field of Classification Search
CPC .................................................... H04L 63/102
See application file for complete search history.

(56) References Cited

U.S. PATENT DOCUMENTS

| | | | | |
|---|---|---|---|---|
| 8,863,276 B2* | 10/2014 | Giblin | ................ | G06F 11/328 726/21 |
| 9,985,983 B2* | 5/2018 | Seiver | ................ | H04L 43/0876 |
| 2005/0091539 A1* | 4/2005 | Wang | ................ | G06F 21/31 726/4 |
| 2007/0061869 A1* | 3/2007 | DeHaas | ................ | G06F 21/6209 726/2 |
| 2009/0038005 A1* | 2/2009 | Howarth | ................ | H04L 63/102 726/21 |
| 2010/0251334 A1* | 9/2010 | Xiao | ................ | H04L 41/0893 726/3 |
| 2011/0209196 A1* | 8/2011 | Kennedy | ................ | G06F 21/55 726/1 |
| 2014/0215603 A1* | 7/2014 | Giblin | ................ | G06F 11/328 726/21 |
| 2015/0370824 A1* | 12/2015 | Chui | ................ | G06F 17/30289 707/786 |
| 2016/0063268 A1* | 3/2016 | Cheatham, III | ................ | G06F 21/10 726/28 |
| 2016/0100019 A1* | 4/2016 | Leondires | ................ | G06F 21/6218 709/204 |

* cited by examiner

*Primary Examiner* — Saleh Najjar
*Assistant Examiner* — Louis C Teng
(74) *Attorney, Agent, or Firm* — Maschoff Brennan

(57) ABSTRACT

Systems and techniques to identify and modify unused (or seldom used) access privileges are described. Group membership data may be correlated with access map data to create a user-resource access map identifying privilege levels associated with individual user accounts to access computing resources in a computing system. User activity event logs generated as a result of user accounts accessing the resources may be correlated with the user-resource access map to identify user accounts that do not use (or seldom use) particular privilege levels to access particular resources. The identified user accounts may be modified to remove the unused (or seldom used) privileges levels.

20 Claims, 5 Drawing Sheets

USAGE-BASED MODIFICATION OF USER PRIVILEGES

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Business-critical information is constantly at risk from threats, both external threats as well as internal threats. Internal threats may include employees with access to sensitive information inadvertently deleting or modifying data to which they have access privileges. Often, some users within a company (e.g., enterprise) may be unaware of the amount of data to which they have access privileges. In addition, as users change roles within the company, over time, users may accumulate permissions to many different types of information. In such cases, some permissions, which were legitimate at one point in time, may no longer be in use.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques to identify and modify unused (or seldom used) access privileges are described. Group membership data may be correlated with access map data to create a user-resource access map identifying privilege levels associated with individual user accounts to access computing resources in a computing system. User activity event logs generated as a result of user accounts accessing the resources may be correlated with the user-resource access map to identify user accounts that do not use (or seldom use) particular privilege levels to access particular resources. The identified user accounts may be modified to remove the unused (or seldom used) privileges levels.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
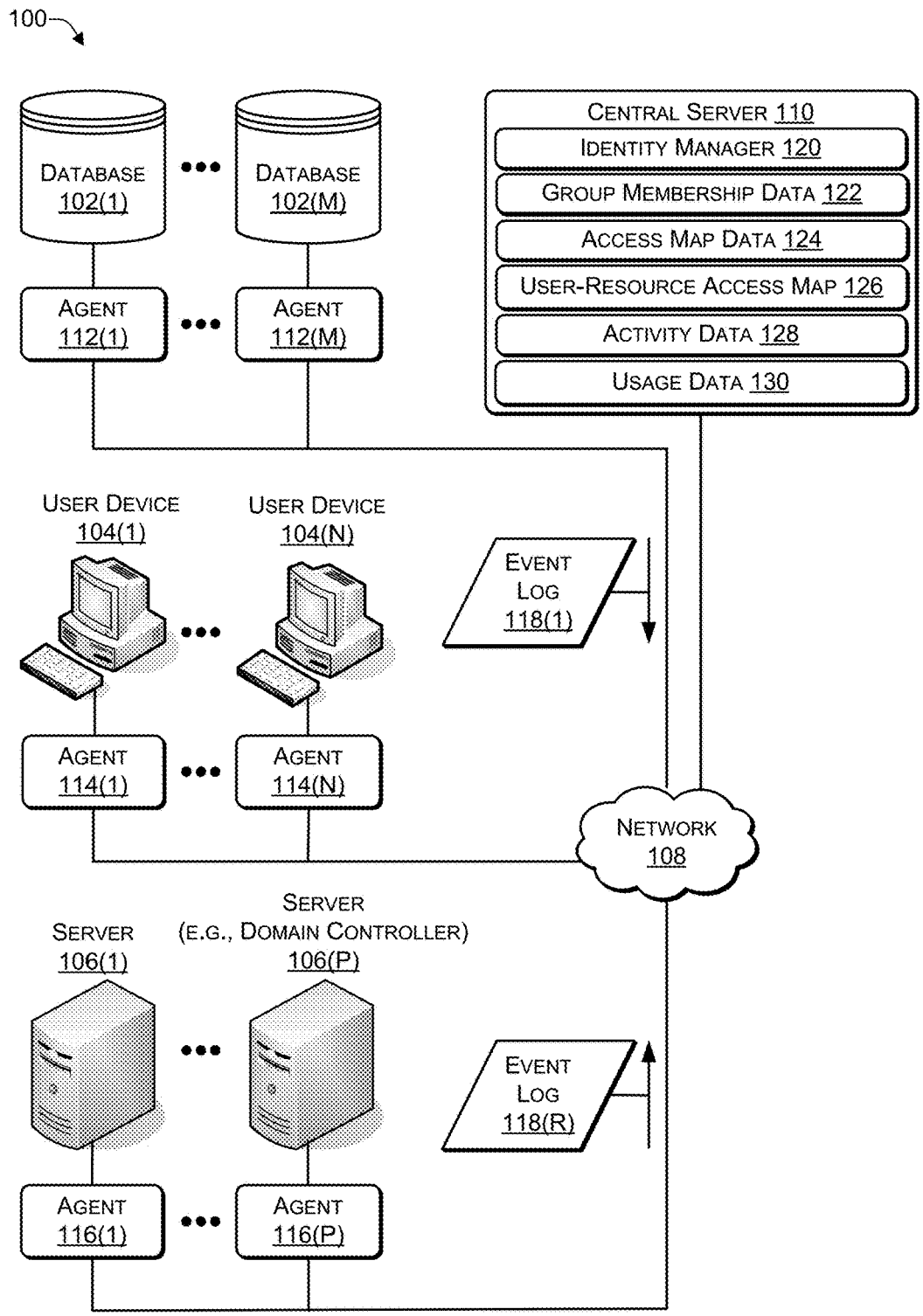
FIG. 1 is a block diagram illustrating a computing system that includes agents to gather configuration information according to some examples.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Systems and techniques are described herein to monitor access privilege usage over a period of time. Based on monitoring the access privilege usage, an identity manager may determine whether access privileges associated with one or more users are unused and automatically (e.g., without human interaction) modify the access privileges based on the access privilege usage. The identity manager may continue to monitor access privilege usage, e.g., over a next period of time, and repeat the process of modifying the access privileges based on the access privilege usage.

An identity manager, such as Dell® One Identity Manager—Data Governance Edition, may monitor the usage of privileges associated with user accounts across an enterprise using event data collected over a period of time. In some configurations, each time an event occurs, event data may be generated. For example, the event data may be generated each time a user account uses the privileges associated with the user account to access resources (e.g., a server, a database, a workstation, a folder, or the like) in a computing system.

The identity manager may analyze (e.g., using a classifier or other machine learning algorithm) the event data generated by each user account over a predetermined period of time (e.g., a time period specified by a system administrator) to determine which privileges are being used and which privileges are unused (or seldom used) by each user account. For example, if an access privilege to a particular resource is used for less than a threshold percentage (e.g., five percent) of the time, then the access privilege may be considered to be "seldom used" and may be a candidate for removal.

The identity manager may automatically (e.g., without human interaction) modify privileges associated with one or more user accounts based on which privileges are unused (or infrequently used). For example, the identity manager may remove privileges to access a resource from a user account if those privileges are not used (or rarely used) to access the resource with the privileges (e.g., during the predetermined time period). To illustrate, a user account may have read access and write access to a resource (e.g., a database) and during a period of time, the user account may access the resource to read data but not to write data. Based on this analysis, write privileges to the database may be removed from the user account.

Agents deployed throughout an enterprise computing system may collect activity event logs generated by access activity associated with user accounts. The activity event logs may be generated by a wide variety of activities, such as file system activities, activities associated with a document database (e.g., SharePoint®), activities associated with network attached storage (NAS) devices, and the like.

To determine which privileges to modify, the identity manager may maintain, correlate, and analyze several types of data structures, such as group membership data, access mapping data, activity data gathered over a predetermined period of time, other information related to user privileges, or any combination thereof. The group membership data may map each user account to membership in a particular group (or set of groups), where each group has access to a particular resource (e.g., database, workstation, server, folder, etc.). For example, a database administrator group may include multiple user accounts that have access privileges to databases in a computer system.

The access mapping data may map each group to an access level associated with the access privileges. For example, a first user account belonging to a first group may have full (e.g., read access and write access) database access privileges while a second user account belonging to a second group may have read-only database access privileges. The activity data generated from monitoring user access to resources over a period of time may include information identifying which operations were performed with which permission level (e.g., privileges). For example, a user account with read/write access privileges to databases in a computer system may perform several read operations over a period of time but may not perform any write operations. Based on this information, the identity manager may modify the user account to remove write privileges to the database because the user account was not used to perform write operations during the period of time that was analyzed.

The identity manager may combine (i) a group membership mapping that identifies which user accounts belong to which groups with (ii) an access mapping that identifies access privileges associated with each group to create a user-to-resource access mapping that identifies the access privileges each user account has and the resources to which the user account has access privileges. The identity manager may correlate resource activity data gathered from an enterprise computing system over a predetermined time period with the user-to-resource access mapping (e.g., a user account has read/write access privileges to a first database and read-only access privileges to a second database) and associate a usage indicator with each user-to-resource access mapping. For example, the usage indicator may indicate how many times a user account with a particular access privilege accessed a resource during the predetermined time period. In some cases, the usage indicator may be a Boolean value (e.g., a flag) that indicates whether or not a user account with a particular access privilege accessed a resource during the predetermined time period.

A user-to-resource access mapping that has an indicator indicating that a user account with a particular set of permissions accessed a resource less than a threshold number of time may be identified as a candidate for permission modification. Permissions associated with a user account may be modified in several different ways. As a first example, the permissions associated with a seldom accessed resource may be set to deny access, effectively preventing access without modifying user permissions, group memberships, or the like. As a second example, the user account may be removed from one or more groups that have been granted access to the resource, thereby preventing the user account from accessing the resource. The identity manager may have sufficient data (e.g., based on the user-to-resource access mapping and the activity data) to determine if removing the user account from the one or more groups will have adverse consequences. As a third example, an entry in an access policy (e.g., Dell® Change Auditor® protection policy) may be added to deny the user account access to the resource. If the user account's access to the resource was legitimate and the access was erroneously removed, e.g., due to infrequent resource access or another similar reason, a system administrator may enable the user account to access the resource, such as by removing the entry in the access policy.

Using an identity manager to gather data about user accounts accessing resources and automatically modifying the access (e.g., by removing access to resources that are not accessed) may enable many different situations to be easily addressed. For example, when a user leaves a company, whether voluntarily or involuntarily, the identity manager may automatically remove access to resources based on the lack of usage of the user account even if a system administrator inadvertently fails to remove access. Even if a user account that legitimately has access to a resource is modified to remove access (e.g., due to lack of usage of the privileges of the user account to access the resource), a user may easily have the access reinstated by going through "proper channels." For example, a user with a user account for which access privileges have been removed or reduced may submit an access request. A system administrator may receive the access request and verify (i) that the user account is to have access to the resource, (ii) that the user account is to have a certain level of privileges, (iii) that the user account is to belong to a certain group, or the like.

In addition, the identity manager periodically re-checks which user accounts have which privileges and can access which resources and automatically adjusts the privileges and resource access based on usage, e.g., removing privileges that are not being used and disabling access to resources that are not being accessed. The time interval over which the identity manager gathers data may be adjusted by a system administrator (or other user) based on the usage in the computing system. For example, the time interval may be set to N months, where N>0. N may be smaller in a company that experiences high employee turnover and larger in a company with low employee turnover or where privileges are infrequently modified.

FIG. 1 is a block diagram illustrating a computing system 100 that includes agents to gather configuration information according to some examples. The computing system 100 may include multiple types of components (e.g., resources), including a representative one or more databases, such as a database 102(1) to a database 102(M), a representative one or more user devices, such as a user device 104(1) to a user device 104(N), and a representative one or more servers, such as a server 106(1) to a server 106(P), where M>1, N>1, and P>1, and where M, N, and P are not necessarily the same. Of course, other types of resources, such as directories, data, etc., may be located in the computing system 100. The user devices 104 may include workstations, laptops, tablets, wireless phones, and other types of computing devices used to access other components of the computing system 100. The databases 102, the user devices 104, and the servers 106 may be connected via a network 108 to each other and to a central server 110.

At least some of the components of the computing system 100 may have an associated agent that monitors a component and generates a log when a particular event occurs. For example, agents 112(1) to 112(M) may be associated with the databases 102(1) to 102(M), e.g., the agent 112(1) may be associated with the database 102(1) and the agent 112(M) may be associated with the database 102(M). Agents 114(1) to 114(N) may be associated with the user devices 104(1) to 104(N), e.g., the agent 114(1) may be associated with the user device 104(1) and the agent 114(N) may be associated with the user device 104(N). Agents 116(1) to 116(P) may be associated with the servers 106(1) to 106(P), e.g., the agent 116(1) may be associated with the server 106(1) and the agent 116(P) may be associated with the server 106(P).

Each component of the computing system 100 may have a corresponding agent that monitors a particular component and generates an event log, such as one of event logs 118(1) to 118(R) (where R>1), when an event occurs. For example, the agents 112 may monitor the databases 102 and one of the agents 112 may generate one of the event logs 118 when a particular event, e.g., such as a read access or a write access, occurs. For example, one of the agents 112 may generate an event log each time one of the databases 102 is modified, e.g., each time (i) data is added to one of the databases 102, (ii) deleted from one of the databases 102, or (iii) changed in one of the databases 102.

The events logs 118 that are generated by the agents 112 may include an identity of the user account accessing the database (e.g., including credentials such as username and password), an identity of the component being accessed (e.g., an identifier associated with one of the databases 102), an access privilege level (e.g., read-write access level, read access level, write access level, etc.) associated with the access, a type of access associated with the event (e.g., read-write access, read access, write access, etc.), a timestamp identifying when the event occurred (or when the event was generated), other event-related information, or any combination thereof. For example, the type of access associated with the event may be identified as read access when a user account reads from one of the databases 102, the type of access associated with the event may be identified as write access when a user account writes to one of the databases 102, the type of access associated with the event may be identified as read-write access when a user account writes to and reads from one of the databases 102.

The agents 114 may monitor the user devices 104. One of the agents 114 may generate one of the event logs 118 when a particular event occurs. For example, one of the agents 114 may generate one of the event logs 118 each time a login occurs on one of the user devices 104, each time of the user devices 104 is used to access one of the databases 102 or one of the servers 106, etc. The events logs 118 that are generated by the agents 114 may include an identity of the user account used to perform the login (e.g., a username and a password), an identity of the component being accessed (e.g., an identifier associated with one of the user devices 104), an access privilege level (e.g., read-write access level, read access level, write access level, etc.) associated with the user account used to perform the login, a timestamp identifying when the event occurred (or when the event was generated), other event-related information, or any combination thereof.

The agents 116 may monitor the servers 106 and one of the agents 116 may generate one of the event logs 118 when a particular event occurs. For example, the agents 116 may generate an event log each time one of the servers 106 is accessed. For example, one of the agents 116 may generate an event log each time one of the servers 106 is modified, e.g., each time (i) data is added to one of the servers 106, (ii) deleted from one of the servers 106, or (iii) changed in one of the servers 106.

The events logs 118 that are generated by the agents 116 may include an identity of the user account performing the access (e.g., account identifier, username and password, or the like), an identity of the component being accessed (e.g., an identifier associated with one of the servers 106), an access privilege level (e.g., read-write access level, read access level, write access level, etc.) associated with the accessing component, a type of access associated with the event (e.g., read-write access, read access, write access, etc.), a timestamp identifying when the event occurred (or when the event was generated), other event-related information, or any combination thereof. For example, the type of access associated with the event may be identified as read access when a user account reads from one of the servers 106, the type of access associated with the event may be identified as write access when a user account writes to one of the servers 106, the type of access associated with the event may be identified as read-write access when a user account writes to and reads from one of the databases servers 106.

The central server 110 may receive the event logs 118(1) to 118(R) from one or more of the agents 112, 114, or 116 via the network 108. The central server 110 may store at least a portion of the event logs 118 in a database, such as one of the databases 102. An identity manager 120 may be a software application (e.g., Dell® Identity Manager) that enables a business owner (e.g., rather than a system administrator or other information technology (IT) professionals) to grant access to sensitive data, including files and folders across an enterprise. The identity manager 120 may automate the request for access and approval workflow, ensuring security while reducing the burden on IT staff.

The identity manger 120 may determine group membership data 122 that identifies which user account belongs to which group. For example, the identity manager 120 may enable a business owner to create a user account for each user that has access to the computing system and to create one or more groups, with each group including zero or more user accounts as members of the group. For example, in a retail business, the business owner may define a customer service group, a supervisor group, and a manager group.

The customer service group may include user accounts of customer service agents with access to ring up sales at point of sale terminals. The supervisor group may include user accounts of supervisors with access to adding, deleting, and modifying work schedules of customer service agents to a work schedule computer. The manager group may include user accounts of managers with access to all components in the computing system 100, including a management computer used to store accounts payable, accounts receivable, and other information related to the business. The mapping identifying the user accounts belonging to each group may be stored in the group membership data 122.

The identity manger 120 may determine access map data 124 that identifies the resource(s) each group can access and the privilege level (e.g., read, write, read-write, etc.) with which the resource can be accessed. For example, the customer service group may have read-write access to the point of sale terminals to enable the customer service agents to process retail transactions. The customer service group may have read access to the work schedule computer to enable the customer service agents to view their respective work schedules. The customer service group may not have any type of access to other components of the computing system 100. The supervisor group may have read-write access to the point of sale terminals and to the work schedule computer but not have access to other components of the computing system 100. The manager group may have read-write access to the point of sale terminals, to the work schedule computer, and to other components of the computing system 100, including the management computer.

The identity manager 120 may correlate the group membership data 122 with the access map data 124 to create a user-resource access map 126 that identifies which resources each user account can access and a privilege level with which the user account can access the resources. For example, user-resource access map 126 may indicate that a first user account that is a member of the customer service group has read-write access to the point of sale terminals and read-only access to the work schedule computer (e.g., no access privileges to the management computer). The user-resource access map 126 may indicate that a second user account that is a member of the supervisor group has read-write access to the point of sale terminals and read-write access to the work schedule computer (e.g., no access privileges to the management computer). The user-resource access map 126 may indicate that a third user account that is a member of the manager group has read-write access to the point of sale terminals, read-write access to the work schedule computer, and read-write access to the management computer.

The identity manager 120 may retrieve (or gather) activity data 128 that includes event logs 118 generated over a predetermined period of time. For example, the identity manager 120 may retrieve a portion of the events logs 118 stored in one of the databases 102 that have an associated timestamp between a first date and time and a second date and time. To illustrate, the activity data 128 may include Q days (or weeks) worth of the event logs 118 (where Q>1). For example, a business may analyze event logs generated for a 3 month period (e.g., every quarter), a 6 month period, a 12 month period, or another time interval.

The identity manager 120 may correlate the activity data 128 with the user-resource access map to create usage data 130 identifying which user accounts were used with which privilege levels to access which resources. For example, the second user account, (e.g., a member of the supervisor group) may have read-write access to the point of sale terminals and read-write access to the work schedule computer but may not have used the read-write access to the point of sale terminals. To illustrate, the second user account may be used by a senior supervisor who does not fill in for customer service agents who are absent and therefore does not use the read-write access to the point of sale terminals.

The identity manager 120 may automatically modify the second user account to remove the read-write access to the point of sale terminals. Modifying the second user account to remove the read-write access to the point of sale terminals may be done in several different ways.

As a first example, the identity manager 120 may determine that the members of the supervisor group do not use (or seldom use) read-write access to the point of sale terminals and remove read-write access to the point of sale terminals from the supervisor group. In this way, members of the supervisor group, such as the second user account, may have read-write access to the work schedule computer and may no longer have read-write access to the point of sale terminals.

As a second example, the identity manager 120 may define a new group, e.g., a senior supervisor group that has read-write access to the work schedule computer (e.g., without any access to the point of sale terminals) and remove the second user account from the supervisor group, and add the second user account to the senior supervisor group. In this way, members of the senior supervisor group, such as the second user account, may have read-write access to the work schedule computer and may not have read-write access to the point of sale terminals.

As a third example, the identity manager 120 may define a new user account, remove the second user account from the supervisor group, add the new user account to the senior supervisor group, and assign the new user account to a user that was previously associated with the second user account. Of course, these are merely examples, and a skilled practitioner would identify other ways to remove the read-write access to the point of sale terminals from the user associated with the second user account.

Thus, an identity manager may determine the user accounts that are members of groups, the access privileges associated with each group to access resources, to create a user-resource access map that identifies the access privileges to access each resource for each user account. The identity manager may correlate activity data with the user-resource access map to determine which privileges are being used and which privileges are unused (or seldom used) and then modify the user accounts or the groups to remove the unused privileges from the user accounts. For example, if an access privilege to a particular resource is used for less than a threshold percentage (e.g., five percent, three percent, one percent, etc.) of the time, then the access privilege may be considered to be "seldom used" and may be a candidate for removal. The threshold percentage may be set by a system administrator or business owner.

Figure 2:
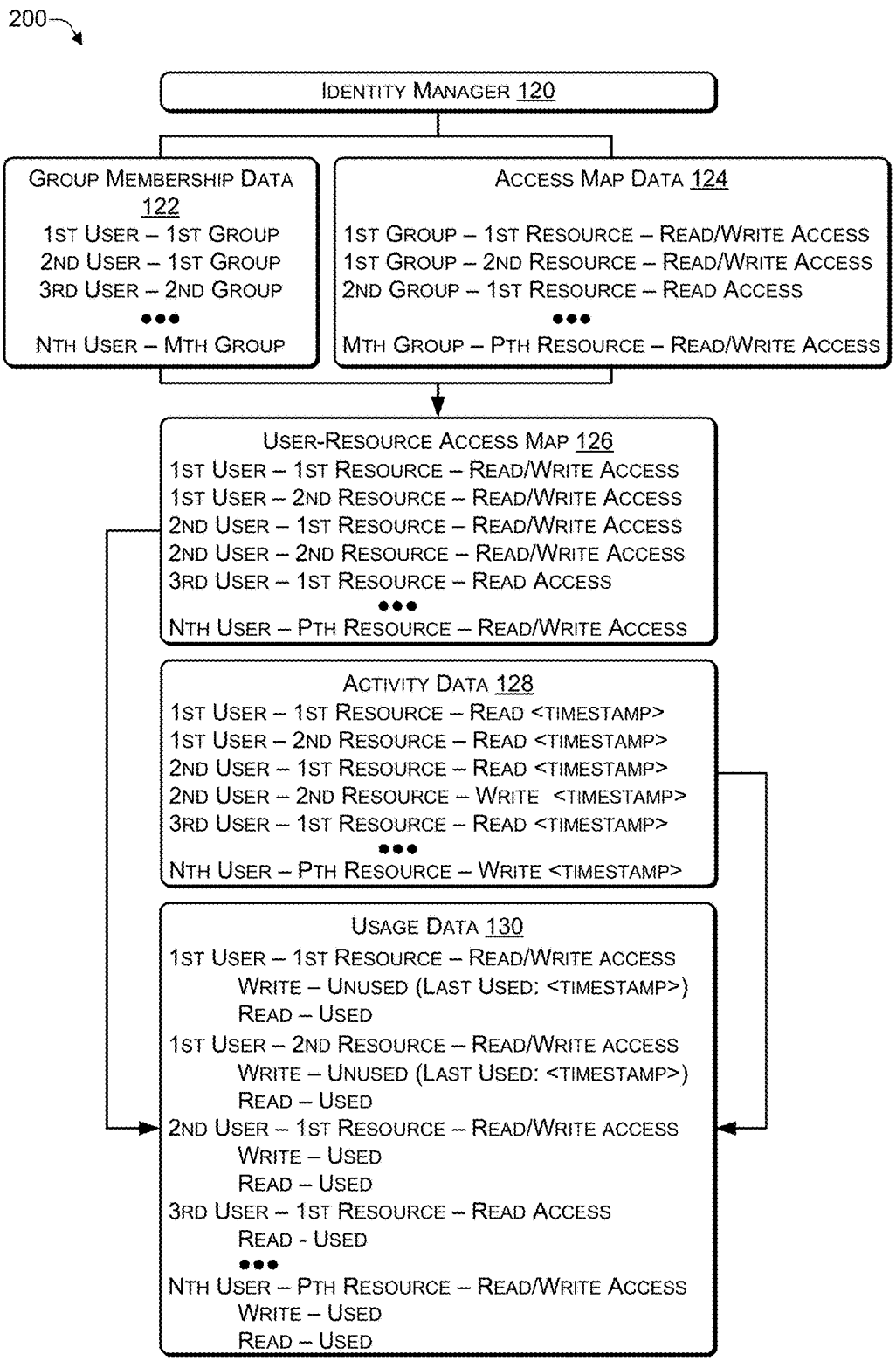
FIG. 2 is a block diagram illustrating a computing system to determine usage data according to some examples.

FIG. 2 is a block diagram illustrating a computing system 100 to determine usage data according to some examples. The identity manger 120 may determine the group membership data 122 that identifies which user account belongs to which group. For example, as illustrated in FIG. 2, the group membership data 122 may indicate that a first user account belongs to a first group, a second user account belongs to the first group, a third user account belongs to a second group, and an Nth user account belongs to an Mth group (where N>0, M>0, N not necessarily equal to M).

The identity manger 120 may determine the access map data 124 that identifies the resource(s) each group can access and the privilege level (e.g., read, write, read-write, etc.)

with which the resource can be accessed. For example, as illustrated in FIG. 2, the access map data 124 may indicate that the first group has read-write access privileges to a first resource and has read-write access privileges to a second resource. The access map data 124 may indicate that the second group has read access privileges to the first resource and the Mth group has read-write access privileges to the Pth resource.

The identity manager 120 may correlate the group membership data 122 with the access map data 124 to create the user-resource access map 126. The user resource access map 126 identifies which resources each user account can access and a privilege level with which the user account can access the resources. For example, as illustrated in FIG. 2, the user-resource access map 126 may indicate that the first user account has read-write access privileges to the first resource and read-write access privileges to the second resource. The user-resource access map 126 may indicate that the second user account has read-write access privileges to the first resource and read-write access privileges to the second resource. The user-resource access map 126 may indicate that the third user account has read access privileges to the first resource (e.g., no access privileges to the second resource). The user-resource access map 126 may indicate that the Nth user account has read-write access privileges to the Pth resource.

The identity manager 120 may determine the activity data 128 based on event logs 118 generated over a predetermined period of time. For example, the identity manager 120 may retrieve a portion of the events logs 118 stored in a database that have an associated timestamp between a first date and time and a second date and time. For example, the predetermined period of time may be a 3 month period (e.g., every quarter), a 6 month period, a 12 month period, or another time interval. The activity data 128 may indicate which user account accessed which resource with which type of access. For example, as illustrated in FIG. 2, the activity data 128 may indicate that the first user accessed the first resource to perform a read at a first point in time (e.g., identified by a first particular timestamp), the first user accessed the second resource at a second point in time, the second user accessed the first resource at a third point in time, the second user accessed the second resource at a fourth point in time, the third user accessed the first resource at a fifth point in time, and the Nth user accessed the Pth resource at another particular point in time.

The identity manager 120 may correlate the activity data 128 with the user-resource access map 126 to create the usage data 130 identifying which user accounts are used with which privilege levels to access which resources. The identity manager 120 may determine a Boolean field to the usage data 130 indicating whether an access privilege to a resource was used or may determine a percentage field indicating a percentage of the time that an access privilege was used. For example, if an access privilege to a particular resource is used for less than a threshold percentage (e.g., five percent) of the time, then the access privilege may be considered to be "seldom used" and may be a candidate for removal. In some cases, if an access privilege to a particular resource was unused (or seldom used) during the predetermined period of time for which the activity data 128 was gathered, the identity manager 120 may search the stored event logs 118 to determine when the access privilege to the particular resource was last used and add a "last used" field along with a timestamp indicating when the access privilege to the particular resource was last used.

As illustrated in FIG. 2, the usage data 130 may indicate that, during the time period during which the activity data 128 was gathered, the first user account has read-write access to the first resource, the write access was unused, and the read access was used. The usage data 130 may indicate when an account, such as the first user account, last used a privilege level that is identified as unused. For example, the usage data 130 may include a timestamp identifying when the first user account was last used to write to the first resource, (e.g., the timestamp may be prior to the time period associated with the activity data 128).

The usage data 130 may indicate a length of time since the first user account was used to write to the first resource. For example, the timestamp identifying when the first user account was last used to write to the first resource may be subtracted from a current timestamp to determine the length of time since the first user account was last used to write to the first resource. The usage data 130 may indicate that, during the time period during which the activity data 128 was gathered, the first user account has read-write access to the second resource, the write access was unused, and the read access was used. The usage data 130 may indicate when the write access was last used, how long (e.g., how many days) since the write access was last used, or both. The usage data 130 may indicate that the second user account has read-write access to the first resource, the write access was used, and the read access was used. The usage data 130 may indicate that the third user account has read access to the first resource and the read access was used. The usage data 130 may indicate that the Nth user account has read-write access to the Pth resource, the write access was used, and the read access was used.

After determining the activity data 128 and identifying which privilege levels were unused (or seldom used) during the time period associated with the activity data 128, the identity manager 120 may automatically modify user accounts with unused (or seldom used) privilege levels. For example, the identity manager 120 may determine that the first user account's write access to the first resource is unused (or seldom used) and may remove the write access (e.g., privilege level) to the first resource. The identity manager 120 may determine that the first user account's write access to the second resource is unused (or seldom used) and may remove the write access privilege level to the first resource.

Modifying a user account to remove an unused (or seldom used) privilege level may be done in several different ways. As a first example, the identity manager 120 may determine that the members of the first group do not use (or seldom use) write access to the first resource and remove write access to the first resource from the first group. In this way, members of the first group, such as the first user account, may have read access to the first resource. As a second example, the identity manager 120 may define a new group, e.g., a Qth group that has read access to the first resource and remove the first user account from the first group, and add the first user account to the Qth group. In this way, members of the Qth group, such as the first user account, may have read access to the first resource. As a third example, the identity manager 120 may define a new user account, remove the first user account from the first group, add the new user account to the second group that has read access to the first resource, and assign the new user account to a user that was previously associated with the first user account. Of course, the identity manager may perform other combinations of (i) modifications to group memberships, (ii) modifications to group access privileges, and (iii) modifications to user accounts to remove write access to the first resource by the first user account.

Thus, an identity manager may determine the user accounts that are members of groups, the access privileges associated with each group to access resources, to create a user-resource access map that identifies the access privileges to access each resource for each user account. The identity manager may correlate activity data with the user-resource access map to determine which privileges are being used and which privileges are unused (or seldom used) and automatically modify the user accounts or the groups to remove the unused (or seldom used) privileges from the user accounts.

Figure 3:
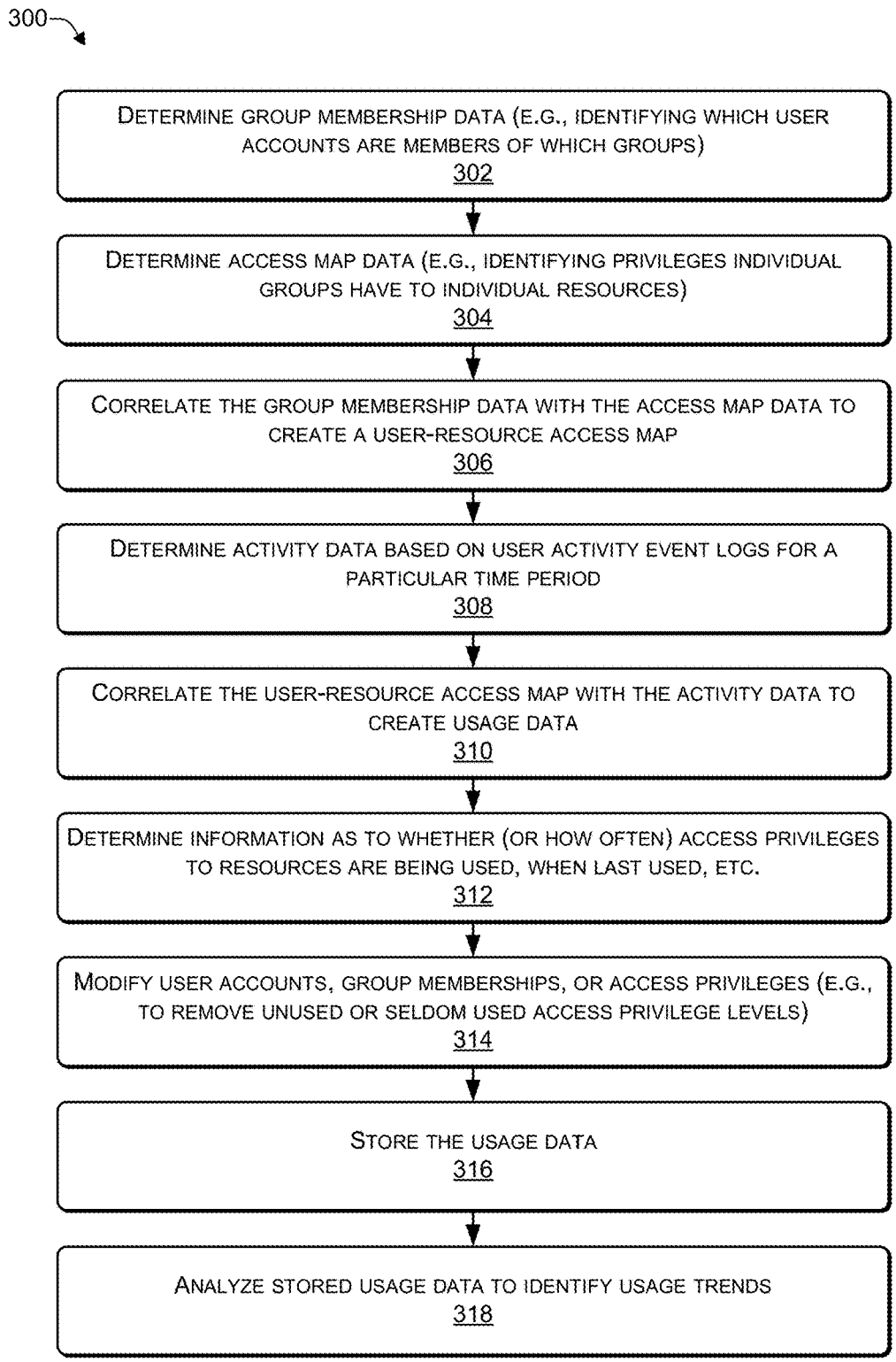
FIG. 3 is a flowchart of a process that includes correlating group membership data with access map data to create a user-resource access map according to some examples.
Figure 4:
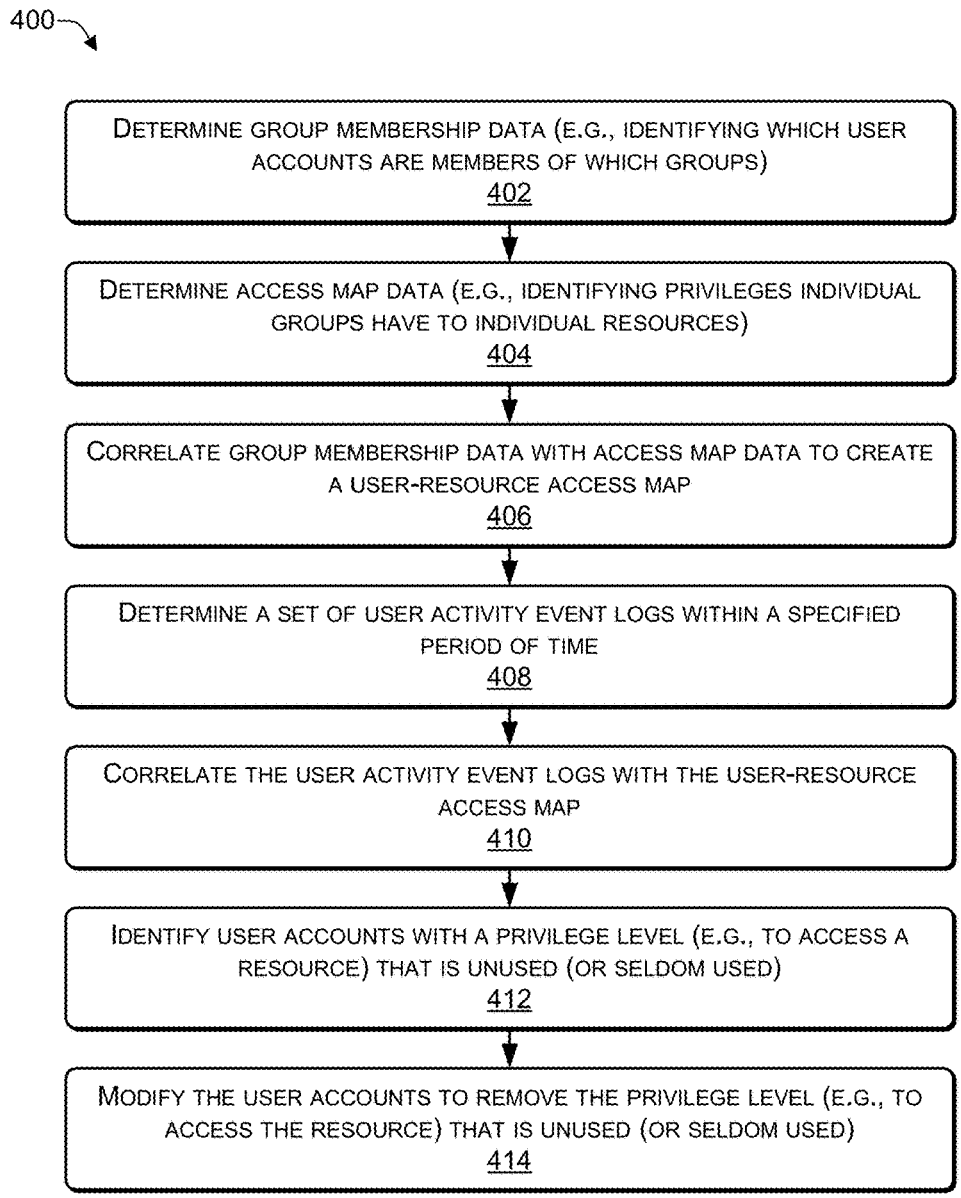
FIG. 4 is a flowchart of a process that includes modifying user accounts to remove unused (or seldom used) privilege levels according to some examples.

In the flow diagrams of FIGS. 3 and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2 as described above, although other models, frameworks, systems and environments may implement these processes.

FIG. 3 is a flowchart of a process 300 that includes correlating group membership data with access map data to create a user-resource access map according to some examples. The process 300 may be performed by the identity manager 120 of FIGS. 1 and 2.

At 302, group membership data may be determined. At 304, access map data may be determined. At 306, the group membership data may be correlated with the access map data to create a user-resource access map. For example, in FIG. 2, the identity manger 120 may determine the access map data 124 that identifies the resource(s) each group can access and the privilege level (e.g., read, write, read-write, etc.) with which the resource can be accessed. As illustrated in FIG. 2, the access map data 124 may indicate that the first group has read-write access privileges to a first resource and has read-write access privileges to a second resource. The access map data 124 may indicate that the second group has read access privileges to the first resource and the Mth group has read-write access privileges to the Pth resource. The identity manager 120 may correlate the group membership data 122 with the access map data 124 to create the user-resource access map 126 that identifies which resources each user account can access and a privilege level with which the user account can access the resources. For example, as illustrated in FIG. 2, the user-resource access map 126 may indicate that the first user account has read-write access privileges to the first resource and read-write access privileges to the second resource. The user-resource access map 126 may indicate that the second user account has read-write access privileges to the first resource and read-write access privileges to the second resource. The user-resource access map 126 may indicate that the third user account has read access privileges to the first resource (e.g., no access privileges to the second resource). The user-resource access map 126 may indicate that the Nth user account has read-write access privileges to the Pth resource.

At 308, activity data based on user activity event logs for a particular time period may be determined. At 310, the user-resource access map may be correlated with the activity data to create usage data. At 312, information may be determined, such as whether particular access privileges are being used, how frequently the access privileges are being used, when the access privileges were last used, etc. For example, in FIG. 2, the identity manager 120 may determine the activity data 128 based on event logs 118 generated over a predetermined period of time. The activity data 128 may indicate which user account accessed which resource with which type of access. For example, as illustrated in FIG. 2, the activity data 128 may indicate that the first user accessed the first resource to perform a read at a first point in time (e.g., identified by a first particular timestamp), the first user accessed the second resource at a second point in time, the second user accessed the first resource at a third point in time, the second user accessed the second resource at a fourth point in time, the third user accessed the first resource at a fifth point in time, and the Nth user accessed the Pth resource at another particular point in time. The identity manager 120 may correlate the activity data 128 with the user-resource access map 126 to create the usage data 130 identifying which user accounts are used with which privilege levels to access which resources. The identity manager 120 may determine a Boolean field to the usage data 130 indicating whether an access privilege to a resource was used or may determine a percentage field indicating a percentage of the time that an access privilege was used. For example, if an access privilege to a particular resource is used for less than a threshold percentage (e.g., five percent) of the time, then the access privilege may be considered to be "seldom used" and may be a candidate for removal. To illustrate, the first user account may access the first resource 25 times during a one month period, with twenty-four read accesses and one write access. In this illustration, the write access privilege level is used 4% (=1/25) of the time and may be considered "seldom used" if the threshold is 5%. If an access privilege to a particular resource was unused (or seldom used) during the predetermined period of time for which the activity data 128 was gathered, the identity manager 120 may search the stored event logs 118 to determine when the access privilege to the particular resource was last used and add a "last used" field along with a timestamp indicating when the access privilege to the particular resource was last used. As illustrated in FIG. 2, the usage data 130 may indicate that, during the time period during which the activity data 128 was gathered, the first user account has read-write access to the first resource, the write access was unused, and the read access was used. The usage data 130 may indicate when an account, such as the first user account, last used a privilege level that is identified as unused. For example, the usage data 130 may include a timestamp identifying when the first user account was last used to write to the first resource, (e.g., the timestamp may be prior to the time period associated with the activity data 128). The usage data 130 may indicate a length of time since the first user account was used to write to the first resource. For example, the timestamp identifying when the first user account was last used to write to the first resource may be subtracted from a current timestamp to determine the length of time since the first user account was last used to write to the first resource. The usage data 130 may indicate that, during the time period during which the activity data 128 was gathered, the first user account has read-write access to the second resource, the write access was unused, and the read access was used. The usage data 130 may indicate when the write access was last used, how long (e.g., how many days) since the write access was last used, or both.

At 314, one or more of the user accounts, the group memberships, or the access privileges of the group accounts may be modified, e.g., to remove unused (or seldom used) privileges. Modifying a user account to remove an unused (or seldom used) privilege level may be done in several different ways. For example, the identity manager 120 may determine that the members of the first group do not use (or seldom use) write access to the first resource and remove write access to the first resource from the first group. As another example, the identity manager 120 may define a new group, e.g., a Qth group that has read access to the first resource and remove the first user account from the first group, and add the first user account to the Qth group. As yet another example, the identity manager 120 may define a new user account, remove the first user account from the first group, add the new user account to the second group that has read access to the first resource, and assign the new user account to a user that was previously associated with the first user account. Of course, the identity manager may perform other combinations of (i) modifications to group memberships, (ii) modifications to group access privileges, and (iii) modifications to user accounts to remove write access to the first resource by the first user account.

At 316, the usage data may be stored. At 318, the usage data along with other stored usage data may be analyzed to identify usage trends and to modify the user accounts, group memberships, and access privileges to resources. For example, in FIG. 1, the usage data 130 may be stored in one of the databases 102 and may be analyzed, along with previously stored usage data, to identify trends. Over a period of time (e.g., months or years), roles in an organization may evolve and some groups that have been provided with a particular access privilege level to a resource may no longer (or seldom) use the particular access privilege level to the resource. The trend analysis may determine that over a three year period, a percentage of time that a group was using a particular privilege access level to access a resource declined from 50% of the time (e.g., three years ago) to 10% of the time. Based on the trend analysis identifying that the particular privilege access level to access the resource was declining, the identity manager 120 may remove the particular privilege access level to access the resource from the group.

Thus, an identity manager may determine the user accounts that are members of groups, the access privileges associated with each group to access resources, to create a user-resource access map that identifies the access privileges to access each resource for each user account. The identity manager may correlate activity data with the user-resource access map to determine which privileges are being used and which privileges are unused (or seldom used) and automatically modify the user accounts or the groups to remove the unused (or seldom used) privileges from the user accounts. Thus, unused (or seldom used) access privilege levels may be automatically removed by the identity manager. Thus, even if a system administrator does not, due to an oversight, remove an access privilege level, the identity manager may automatically identify and remove the access privilege level.

FIG. 4 is a flowchart of a process 400 that includes modifying user accounts to remove unused (or seldom used) privilege levels according to some examples. The process 400 may be performed by the identity manager 120 of FIGS. 1 and 2.

At 402, group membership data may be determined. At 404, access map data may be determined. At 406, the group membership data may be correlated with the access map data to create a user-resource access map. For example, in FIG. 2, the identity manger 120 may determine the access map data 124 that identifies the resource(s) each group can access and the privilege level (e.g., read, write, read-write, etc.) with which the resource can be accessed. For example, as illustrated in FIG. 2, the access map data 124 may indicate that the first group has read-write access privileges to a first resource and has read-write access privileges to a second resource. The access map data 124 may indicate that the second group has read access privileges to the first resource and the Mth group has read-write access privileges to the Pth resource. The identity manager 120 may correlate the group membership data 122 with the access map data 124 to create the user-resource access map 126 that identifies which resources each user account can access and a privilege level with which the user account can access the resources. For example, as illustrated in FIG. 2, the user-resource access map 126 may indicate that the first user account has read-write access privileges to the first resource and read-write access privileges to the second resource. The user-resource access map 126 may indicate that the second user account has read-write access privileges to the first resource and read-write access privileges to the second resource. The user-resource access map 126 may indicate that the third user account has read access privileges to the first resource (e.g., no access privileges to the second resource). The user-resource access map 126 may indicate that the Nth user account has read-write access privileges to the Pth resource.

At 408, activity data based on user activity event logs for a particular time period may be determined. At 410, the user-resource access map may be correlated with the activity data to create usage data. At 412, user accounts with unused or seldom used resource access privilege levels may be identified. For example, in FIG. 2, the identity manager 120 may determine the activity data 128 based on event logs 118 generated over a predetermined period of time. The activity data 128 may indicate which user account accessed which resource with which type of access. For example, as illustrated in FIG. 2, the activity data 128 may indicate that the first user accessed the first resource to perform a read at a first point in time (e.g., identified by a first particular timestamp), the first user accessed the second resource at a second point in time, the second user accessed the first resource at a third point in time, the second user accessed the second resource at a fourth point in time, the third user accessed the first resource at a fifth point in time, and the Nth user accessed the Pth resource at another particular point in time. The identity manager 120 may correlate the activity data 128 with the user-resource access map 126 to create the usage data 130 identifying which user accounts are used with which privilege levels to access which resources. The identity manager 120 may determine a Boolean field to the usage data 130 indicating whether an access privilege to a resource was used or may determine a percentage field indicating a percentage of the time that an access privilege was used. For example, if an access privilege to a particular resource is used for less than a threshold percentage (e.g., five percent) of the time, then the access privilege may be considered to be "seldom used" and may be a candidate for removal. To illustrate, the first user account may access the first resource 25 times during a one month period, with twenty-four read accesses and one write access. In this illustration, the write access privilege level is used 4% ($=1/25$) of the time and may be considered "seldom used" if the threshold is 5%. If an access privilege to a particular resource was unused (or seldom used) during the predetermined period of time for which the activity data 128 was gathered, the identity manager 120 may search the stored event logs 118 to determine when the access privilege to the particular resource was last used and add a "last used" field along with a timestamp indicating when the access privilege to the particular resource was last used. As illustrated in FIG. 2, the usage data 130 may indicate that, during the time period during which the activity data 128 was gathered, the first user account has read-write access to the first resource, the write access was unused, and the read access was used. The usage data 130 may indicate when an account, such as the first user account, last used a privilege level that is identified as unused. For example, the usage data 130 may include a timestamp identifying when the first user account was last used to write to the first resource, (e.g., the timestamp may be prior to the time period associated with the activity data 128). The usage data 130 may indicate a length of time since the first user account was used to write to the first resource. For example, the timestamp identifying when the first user account was last used to write to the first resource may be subtracted from a current timestamp to determine the length of time since the first user account was last used to write to the first resource. The usage data 130 may indicate that, during the time period during which the activity data 128 was gathered, the first user account has read-write access to the second resource, the write access was unused, and the read access was used. The usage data 130 may indicate when the write access was last used, how long (e.g., how many days) since the write access was last used, or both.

At 412, the user account may be modified to remove unused (or seldom used) privilege levels. Modifying a user account to remove an unused (or seldom used) privilege level may be done in several different ways. For example, the identity manager 120 may determine that the members of the first group do not use (or seldom use) write access to the first resource and remove write access to the first resource from the first group. As another example, the identity manager 120 may define a new group, e.g., a Qth group that has read access to the first resource and remove the first user account from the first group, and add the first user account to the Qth group. As yet another example, the identity manager 120 may define a new user account, remove the first user account from the first group, add the new user account to the second group that has read access to the first resource, and assign the new user account to a user that was previously associated with the first user account. Of course, the identity manager may perform other combinations of (i) modifications to group memberships, (ii) modifications to group access privileges, and (iii) modifications to user accounts to remove write access to the first resource by the first user account.

Thus, an identity manager may determine the user accounts that are members of groups, the access privileges associated with each group to access resources, to create a user-resource access map that identifies the access privileges to access each resource for each user account. The identity manager may correlate activity data with the user-resource access map to determine which privileges are being used and which privileges are unused (or seldom used) and automatically modify the user accounts or the groups to remove the unused (or seldom used) privileges from the user accounts. Thus, unused (or seldom used) access privilege levels may be automatically removed by the identity manager. Thus, even if a system administrator does not, due to an oversight, remove an access privilege level, the identity manager may automatically identify and remove the access privilege level.

Figure 5:
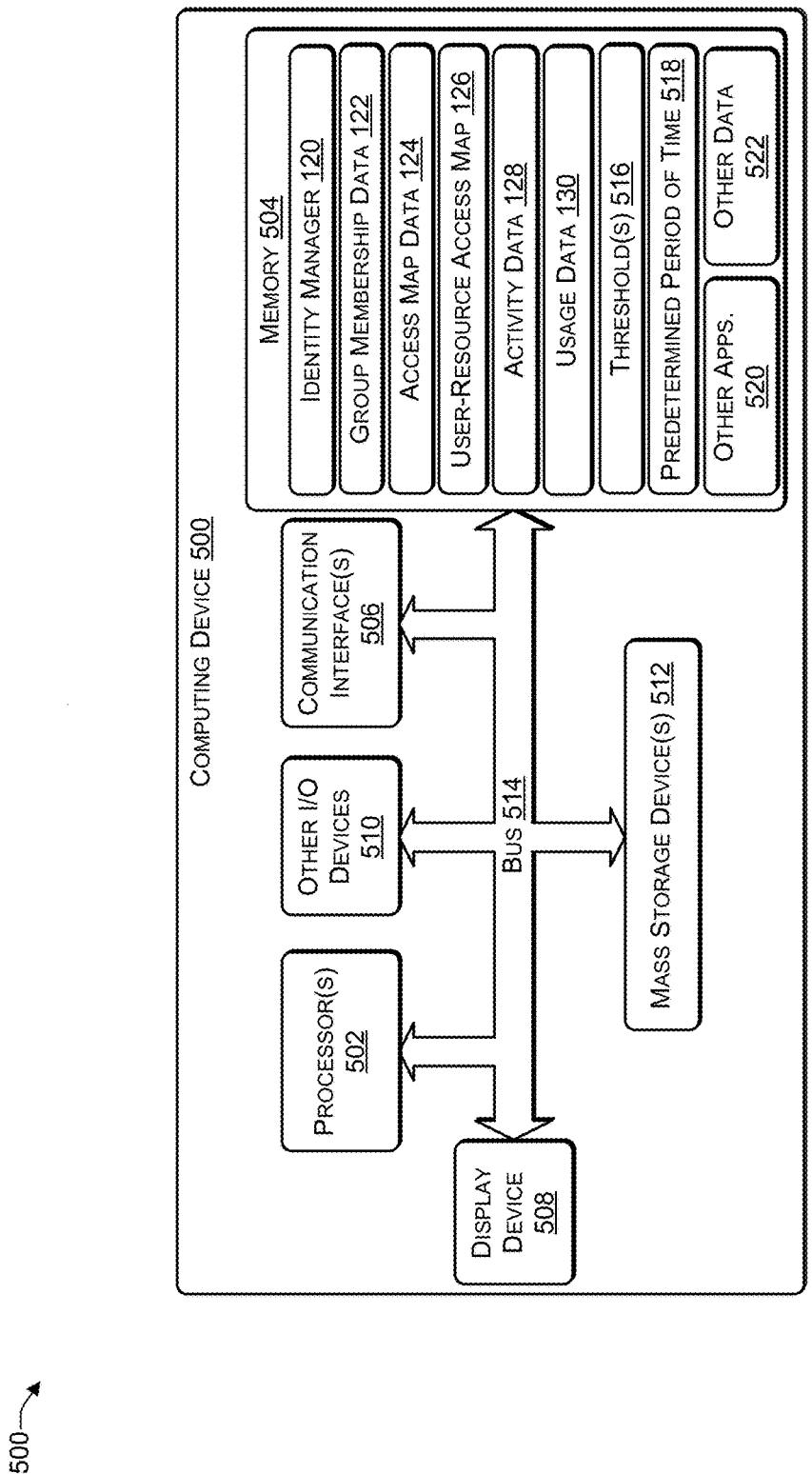
FIG. 5 illustrates an example configuration of a computing device that can be used to implement the systems and techniques described herein.

FIG. 5 illustrates an example configuration of a computing device 500 that can be used to implement the systems and techniques described herein, such as the central server of FIG. 1. The computing device 500 may include one or more processors 502, a memory 504, communication interfaces 506, a display device 508, other input/output (I/O) devices 510, and one or more mass storage devices 512, configured to communicate with each other, such as via a system bus 514 or other suitable connection.

The processor 502 is a hardware device (e.g., an integrated circuit) that may include one or more processing units, at least some of which may include single or multiple computing units or multiple cores. The processor 502 can be implemented as one or more hardware devices, such as microprocessors, microcomputers, microcontrollers, digital signal processors, central processing units, state machines, logic circuitries, and/or any devices that manipulate signals based on executing operational instructions. Among other capabilities, the processor 502 can be configured to fetch and execute computer-readable instructions stored in the memory 504, mass storage devices 512, or other computer-readable media.

Memory 504 and mass storage devices 512 are examples of computer storage media (e.g., memory storage devices) for storing instructions which are executed by the processor 502 to perform the various functions described above. For example, memory 504 may generally include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein, and may be a media capable of storing computer-readable, processor-executable program instructions as computer program code that can be executed by the processor 502 as a particular machine configured for carrying out the operations and functions described in the implementations herein.

The computing device 500 may also include one or more communication interfaces 506 for exchanging data (e.g., via the network 108 of FIG. 1). The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 506 can also provide communication with external storage (not shown), such as in a storage array, network attached storage, storage area network, or the like.

A display device 508, such as a monitor may be included in some implementations for displaying information and images to users. Other I/O devices 510 may be devices that receive various inputs from a user and provide various outputs to the user, and may include a keyboard, a remote controller, a mouse, a printer, audio input/output devices, and so forth.

The computer storage media, such as memory 504 and mass storage devices 512, may be used to store software and data. For example, the computer storage media may be used to store the identity manager 120, the group membership data 122, the access map data 124, the user-resource access map 126, the activity data 128, the usage data 130, one or more threshold 516 (e.g., to determine whether a percentage of a privilege level usage is considered "seldom used"), a predetermined period of time 518 (e.g., used to select a portion of the event logs 118 to create the activity data 128), other applications 520, and other data 522.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
   correlating:
      group membership data including a plurality of user accounts that includes at least a first user account belonging to a first group and a second group, and a second user account belonging to a third group; and
      access map data identifying a first privilege level associated with the first group that is used to access a first resource, a second privilege level associated with the second group that is used to access the second resource, and a third privilege level associated with the third group that is used to access the first resource;
   creating a user-resource access map identifying particular privilege levels corresponding to individual user accounts of the plurality of user accounts to access one or more computer-rooted resources including the first resource and the second resource;
   determining a set of user activity event logs associated with one or more of the plurality of accounts accessing the one or more computer-rooted resources within a predetermined time period;
   correlating the set of user activity event logs with the user-resource access map;
   determining that the first user account did not use the first privilege level to access the first resource above a threshold percentage of time;
   determining that the first user account used the second privilege level to access the second resource above a threshold percentage of time;
   determining that removing the first privilege level from the first user account will not modify membership of the first user account in at least the second group; and
   modifying the first user account to remove the first privilege level based on a determination that removing the first privilege level from the user account will not modify membership of the first user account in at least the second group.

2. The computer-implemented method of claim 1, wherein the one or more computer-rooted resources include at least one of a database, a server, a user workstation, an email system, a directory, or a file.

3. The computer-implemented method of claim 1, wherein the first privilege level comprises write access.

4. The computer-implemented method of claim 1, wherein the second privilege level comprises read access.

5. The computer-implemented method of claim 1, wherein an individual activity event log of the set of user activity event logs identifies:
   a particular user account of the plurality of user accounts used to perform an activity;
   a particular resource of the one or more computer-rooted resources that was accessed by the particular user account;
   a particular privilege level associated with the particular user account that was used to access the particular resource; and
   a date and a time at which the access to the particular resource occurred.

6. The computer-implemented method of claim 1, wherein modifying the first user account to remove the first privilege level comprises:
   removing the first user account from the first group.

7. The computer-implemented method of claim 1, wherein modifying the first user account to remove the first privilege level comprises:
  removing the first privilege level from the first group.

8. One or more non-transitory computer-readable media storing instructions that are executable by one or more processors to perform operations comprising:
  correlating group membership data including a plurality of user accounts that includes at least a first user account belonging to a first group and a second group, and a second user account belonging to a third group with access map data identifying a first privilege level associated with the first group that is used to access a first resource, a second privilege level associated with the second group that is used to access a second resource, and a third privilege level associated with the third group that is used to access the first resource;
  creating a user-resource access map identifying particular privilege levels corresponding to individual user accounts of the plurality of user accounts to access one or more computer-rooted resources including the first resource and the second resource;
  retrieving a set of user activity event logs associated with one or more of the plurality of accounts accessing the one or more computer-rooted resources within a predetermined time period;
  correlating the set of user activity event logs with the user-resource access map;
  determining that the first user account did not use the first privilege level to access the first resource above a threshold percentage of time;
  determining that the first user account used the second privilege level to access the second resource above a threshold percentage of time:
  determining that removing the first privilege level from the user account will not modify membership of the first user account in at least the second group; and
  modifying the first user account to remove the first privilege level based on a determination that removing the first privilege level from the user account will not modify membership of the first user account in at least the second group.

9. The one or more non-transitory computer-readable media of claim 8, wherein the first privilege level comprises write access.

10. The one or more non-transitory computer-readable media of claim 8, wherein the second privilege level comprises read access.

11. The one or more non-transitory computer-readable media of claim 8, wherein an individual activity event log of the set of user activity event logs includes:
  a user account identifier associated with a user account that is used to perform an activity,
  a resource identifier identifying a resource of the one or more computer-rooted resources that was accessed by the user account,
  a privilege level identifier identifying a privilege level used to access the resource, and
  a timestamp indicating a date and a time at which the access to the resource occurred.

12. The one or more non-transitory computer-readable media of claim 8, wherein modifying the first user account to remove the first privilege level comprises:
  removing the rust user account from the first group.

13. The one or more non-transitory computer-readable media of claim 8, wherein modifying the first user account to remove the first privilege level comprises:
  removing the first privilege level from the first group.

14. A server, comprising:
  one or more processors; and
  one or more non-transitory computer-readable media storing instructions that are executable by the one or more processors to:
    correlating group membership data including a plurality of user accounts that includes at least a first user account belonging to a first group and a second group, and a second user account belonging to a third group with access map data identifying a first privilege level associated with the first group that is used to access a first resource, a second privilege level associated with the second group that is used to access a second resource, and a third privilege level associated with the third group that is used to access the first resource;
    creating a user-resource access map identifying particular privilege levels corresponding to individual user accounts of the plurality of user accounts to access one or more computer-rooted resources including the first resource and the second resource;
    retrieving a set of user activity event logs associated with one or more of the plurality of accounts accessing the one or more computer-rooted resources within a predetermined time period;
    correlating the set of user activity event logs with the user-resource access map;
    determining that the first user account did not use the first privilege level to access the first resource above a threshold percentage of time;
    determining that the first user account used the second privilege level to access the second resource above a threshold percentage of time:
    determining that removing the first privilege level from the first user account will not modify membership of the first user account in at least the second group; and
    removing the first privilege level from the first user account based on a determination that removing the first privilege level from the user account will not modify membership of the first user account in at least the second group.

15. The server of claim 14, wherein the first privilege level comprises write access.

16. The server of claim 14, wherein the second privilege level comprises read access.

17. The server of claim 14, wherein an individual activity event log of the set of user activity event logs includes:
  a user account identifier associated with a user account that is used to perform an activity,
  a resource identifier identifying a resource of the one or more computer-rooted resources that was accessed by the user account,
  a privilege level identifier identifying a privilege level used to access the resource, and
  a timestamp indicating a date and a time at which the access to the resource occurred.

18. The server of claim 14, wherein removing the first privilege level from the first user account comprises:
  removing the first user account from the first group.

19. The server of claim 14, wherein removing the first privilege level from the first user account comprises:
  removing the first privilege level from the first group.

20. The server of claim 14, wherein the one or more computer-rooted resources include at least one a database, a server, a user workstation, an email system, a directory, or a file.

* * * * *